Jan. 31, 1967  L. TIGANIK ET AL  3,301,910
PRODUCTION OF TRICHLOROETHYLENE AND TETRACHLOROETHYLENE
Filed Feb. 11, 1964
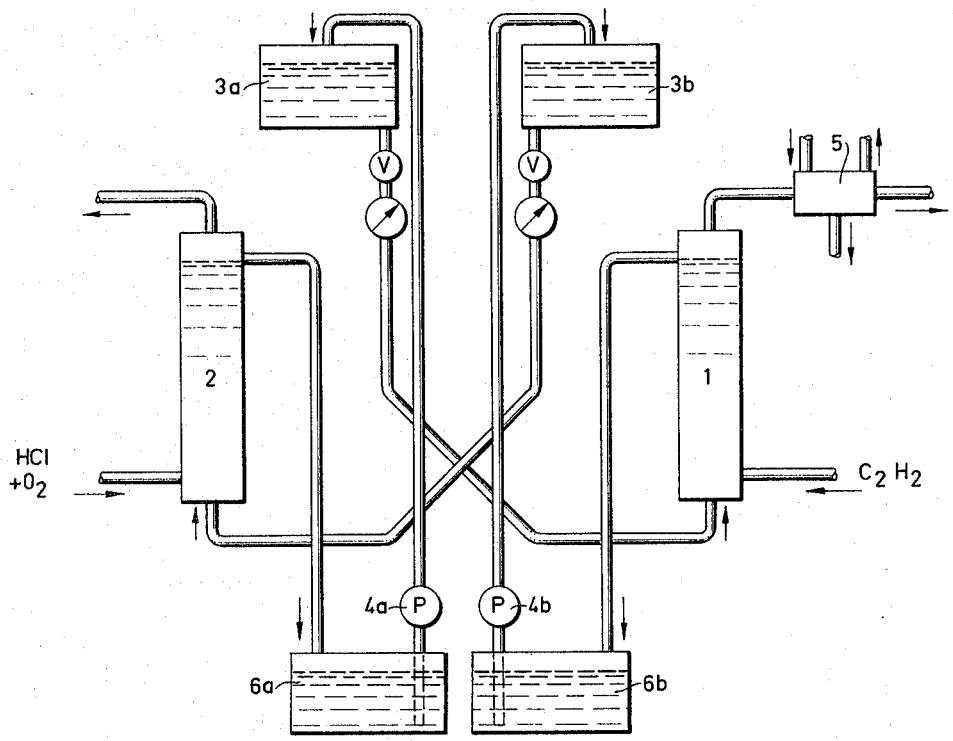
INVENTORS
Leonhard Tiganik
Jan Sven Ragnar Ohlson
BY *Pierce, Scheffler & Parker*
ATTORNEYS United States Patent Office 3,301,910
Patented Jan. 31, 1967

3,301,910
PRODUCTION OF TRICHLOROETHYLENE AND TETRACHLOROETHYLENE
Leonhard Tiganik, Skoghall, and Jan Sven Ragnar Ohlson, Karlshamn, Sweden, assignors to Uddeholms Aktiebolag, Uddeholm, Sweden, a company of Sweden
Filed Feb. 11, 1964, Ser. No. 344,104
Claims priority, application Sweden, Feb. 22, 1963, 1,978/63
6 Claims. (Cl. 260—654)

The present invention relates to a method for the production of trichloroethylene and tetrachloroethylene by a reaction between copper chloride and acetylene.

Trichloroethylene and perchloroethylene are compounds that have been known for a long time and are produced on an industrial scale, usually with acetylene and chlorine as raw materials. The first step in the production of trichloroethylene is the production of tetrachloroethane, which is obtained by addition of chlorination of acetylene with chlorine. For obtaining trichlorethylene the tetrachloroethylene is then treated with lime or thermally cracked. As a by-product is obtained calcium chloride or hydrogen chloride respectively.

Tetrachloroethylene is produced from trichloroethylene by reaction with pentachloroethane or by direct chlorination of acetylene in a gas reaction at 400–500° C.

It is known to chlorinate acetylene with cupric chloride for instance from the German Patent Specification No. 1,011,414, which refers to a method for producing 1,1-dichloroethylene and trans-1,2-dichloroethylene by reaction between acetylene and hydrogen chloride in the presence of cupric (II) and cuprous (I) ions in a ratio of from 1:4 to 1:9. It is also known to produce vinyl chloride, dichloroethylenes, monovinylacetylene, etc., from acetylene, hydrogen chloride and copper chlorides. It is common for all these known methods to work in strongly acidic solutions and with a high content of cuprous (I) ion in relation to cupric (II) ion.

It has now surprisingly been found that the chlorination of acetylene with cupric chloride gives high yields of trichloroethylene and tetrachloroethylene if the acetylene is carried through a reaction solution containing cupric and cuprous ions, where the amount of cupric ions is 50–100 mole percent of the total copper amount, the pH value of the reaction solution being kept at 1–3, preferably 1–2.5, and the temperature of the reaction solution being kept at at least 60° C. pH is here a value measured with a glass electrode. In all pH measurements a sample of the reaction solution is diluted with an equal part of distilled water. Often the reaction solution has been so concentrated, that a dilution has been necessary for carrying out the measurement without crystallization of the solution. Of course it is improper to speak of pH in a solution having the high ionics strengths here used, but the values obtained are well reproducible from case to case.

In the used reaction solution the 1-valent copper may be oxidized to 2-copper with chlorine or with hydrogen chloride and oxygen, for instance in the manner described in German Patent No. 1,094,734 and Swedish Patent No. 178,849. The possibility of utilizing hydrogen chloride as a chlorine source is valuable, as hydrogen chloride is obtained as a by-product in many chlorination reactions.

Trichloroethylene and tetrachloroethylene are formed at a rate, which depends upon the acidity of the solution and its content of cupric ions. For simultaneously obtaining a high reaction rate and a satisfactory yield of tri- and tetrachloroethylene we prefer to work at a pH value of 1–2.5 and at a content of cupric ions which is 70–100 mole percent of the total copper content of the reaction solution. The most favorable range for the formation of trichloroethylene seems to lie at 70–90, and for the formation of tetrachloroethylene at 85–100, calculated as mole percent cupric ions.

The reaction can be carried out batchwise as well as continuously.

It can be carried out in a conventional apparatus, for instance in a vessel with an agitator and a gas inlet, in a column, or a tube reactor. The reaction solution is charged in a reactor and the acetylene is introduced at a temperature of at least 60° C., suitably 80–130° C., in which case a pressure vessel is not needed. The reaction rate can be increased by increasing the temperature above 100° C. and operating in a pressure vessel. The reaction rate can be further increased by supplying the acetylene at such a rate as to produce in the reaction chamber a pressure which is higher than the pressure of saturated steam at the reaction temperature. The cupric chloride is reduced to cuprous chloride while the acetylene is chlorinated. The reaction products gradually leave as vapours as they are formed.

Of a particular interest is the possibility to carry out the reaction continuously. It is then possible to use the range of the reaction, for instance between the cupric ion contents of 75–85 mole percent, where the reaction rate to the desired compound is largest. To make sure that the reaction compound by a possible cooling does not crystallize because of the precipitated cuprous chloride it is suitable to add chlorides of other metals, for instance potassium, sodium, lithium, magnesium, calcium. These additives in certain cases also have an activating effect on the reaction. However, the additives limit the possibilities of working with very high copper chloride contents (more than 4 moles per liter). The latter may be desirable, when working continuously and in the range, where the cupric ion content in relation to the cuprous ion content is so high, that the formed cuprous chloride is held in solution by the chloride ions present. It is thus important for the technical realization of the reaction that the chloride ion content is high. Which cation to use for accomplishing this seems to be of a lesser importance.

In the following some examples of carrying out the reaction are described. The following abbreviations are used:

tri-=trichloroethylene
tetra-=tetrachloroethylene
1,1-=1,1-dichloroethylene
cis-=cis-1,2-dichloroethylene
trans-=trans-1,2-dichloroethylene
rem.=remainder
ent.=entering
outg.=outgoing

*Example 1*

500 ml. of a solution containing 255 g. (=1.5 moles) $CuCl_2.2H_2O$ and 102 g. (=1.5 moles) $MgCl_2.6H_2O$ were introduced in a one-litre retort provided with agitator, thermometer, gas inlet, tube and cooler. The retort was placed in a heat-bath for keeping the temperature at 98° C. during the reaction. Carbon dioxide was introduced for purging air out of the apparatus, whereafter the reaction was started by introducing acetylene (10 litres per hour). The pH of the solution was =2.3 at the start. (pH dropped to 0.9 during the reaction.) The formed reaction products and the distilled water was collected in a tube in a deep freeze-bath at −60° C. The test tube was exchanged each 15 or 30 minutes and the reaction products were weighed and analyzed by means of a gas-chromatograph and an IR-spectrophotometer. The results are listed in the following table.

| Time interval, min. | Formed product, g. | Reaction products in percent | | | | | | Mole percent $Cu^{2+}$ at the end of interval |
|---|---|---|---|---|---|---|---|---|
| | | tri- | tetra- | 1,1- | cis- | trans- | Rem. | |
| 0–30 | 11.87 | 32 | 38 | 1.0 | 0.01 | 8 | 22 | 65 |
| 30–60 | 22.01 | 31 | 26 | 1.4 | 0.01 | 20.5 | 21 | 15 |
| 60–75 | 11.60 | 3 | 0.5 | 5.6 | 0.01 | 57 | 34 | 0 |

The total conversion of acetylene during the test was 70% and the yield of tri- 24% and of tetrachloroethylene 23%.

*Example 2*

This test was carried out in the same apparatus and in the same manner as in Example 1 but the reaction solution contained only 510 g. (=3 moles) $CuCl_2 \cdot 2H_2O$. pH was 1.7 at the start. Acetylene was introduced at a rate of 20 litres per hour. The test could only be continued to a degree of reduction of 40% based on the amount of charged $CuCl_2$, as at this degree of reduction CuCl starts to precipitate.

| Time interval, min. | Formed product, g. | Reaction products in percent | | | | | | Mole percent $Cu^{2+}$ at the end of interval |
|---|---|---|---|---|---|---|---|---|
| | | tri- | tetra- | 1,1- | cis- | trans- | Rem. | |
| 0–15 | 5.55 | 48 | 32 | 1 | 0.1 | 13 | 7 | 88 |
| 15–30 | 12.29 | 64 | 11 | 1 | 0.1 | 12 | 13 | 75 |
| 30–45 | 13.83 | 53 | 1.4 | 2 | 0.1 | 29 | 14 | 65 |
| 45–60 | 12.16 | 33 | 0.2 | 4 | 0.1 | 46 | 17 | ca. 55 |

The total conversion of acetylene during the test was 45% and the yield of trichloroethylene was 50% and of tetrachloroethylene 8%.

*Example 3*

The test was carried out in a cylindrical container having a gas distributor in the bottom through which the acetylene was supplied and the leaving gases being passed from the top of the container to a condenser where the reaction product was collected. After the condenser a manometer and a reducing valve were connected. In the container was charged 200 ml. water solution containing 3 moles copper chloride and 6 moles lithium chloride per litre. 7 mole percent of the total copper amount was present as Cu (I) and the pH of the solution was 1.8. At 120° C. and an absolute pressure of 2.4 atm. acetylene was injected into the solution, the reducing valve being adjusted so as to release 1 litre gas per hour from the apparatus. After one hour 8.5 g. product was obtained in the condenser. The composition was 43% trichloroethylene, 2% tetrachloroethylene and 55% trans-1,2-dichloroethylene. In a corresponding test at 90° C. and atmospheric pressure an amount of 3.3 g. of product was obtained having a composition of 59.3, 3.7 and 37.0%, respectively.

*Example 4*

This test was carried out with a continuous feed and removal of the reaction solution. The reaction vessel consisted of a glass tube with a length of 660 mm. and a thickness of 50 mm. and having a heating coil. The acetylene was supplied through a gas distributor in the lower part of the vessel and the reaction products were allowed to distill off in the upper part of the tube. The fresh reaction solution was supplied at the bottom and the reacted solution flowed out through an over-flow in the middle of the tube. By controlling the supply rate of the solution and the acetylene amount (5 litres per hour) it was possible to obtain 500 ml. of the solution having a relatively constant degree of reduction in the vessel. The concentration of the solution was 3 moles $CuCl_2$ per litre and 6 moles LiCl per litre. pH was =2.3.

The results are given in the table below:

| Time interval, min. | Formed product, g. | Reaction products in percent | | | | | Mole percent $Cu^{2+}$ | |
|---|---|---|---|---|---|---|---|---|
| | | tri- | tetra- | 1,1- | cis- | Trans-+rem. | Ent. sol. | Outg. sol. |
| 0–30 | 2.56 | 61.4 | 34.2 | 1 | 0.04 | 4 | 92 | |
| 30–60 | 4.75 | 65.1 | 16.3 | 1 | 0.07 | 19 | 92 | 76 |
| 60–90 | 6.13 | 67.0 | 7.8 | 1 | 0.06 | 25 | 92 | 77.5 |
| 90–120 | 6.90 | 67.4 | 8.4 | 1 | 0.06 | 24 | 92 | 76 |
| 120–135 | 5.02 | 66.4 | 7.4 | 1 | 0.06 | 26 | 92 | 75.5 |

The conversion of acetylene during the test was about 45% and the yield of trichloroethylene 66% and of tetrachloroethylene 10%.

Example 5

This test was carried out as in Example 4. Only 3 litres acetylene per hour was supplied and pH was =2.6 at the start. Results:

| Time interval, min. | Formed product, g. | Reaction products in percent ||||| Mole percent $Cu^{2+}$ ||
|---|---|---|---|---|---|---|---|---|
| | | tri- | tetra- | 1,1- | cis- | Trans-+rem. | Ent. sol. | Outg. sol. |
| 0-30 | 4.16 | 57.1 | 40.7 | 1 | 0.02 | 3 | 93 | |
| 30-60 | 5.73 | 61.5 | 33.2 | 1 | 0.02 | 5 | 93 | 80 |
| 60-90 | 5.90 | 67.7 | 26.9 | 1 | 0.03 | 5 | 93 | 79 |
| 90-120 | 6.13 | 69.0 | 21.8 | 1 | 0.03 | 9 | 93 | 76 |
| 120-142 | 5.13 | 69.0 | 20.9 | 1 | 0.03 | 10 | 93 | 76 |

The conversion of acetylene during the test was 70% and the yield of trichloroethylene 67% and of tetrachloroethylene 27%.

Example 6

This test was carried out as in Example 3 but the overflow was elevated so that the reaction vessel contained 750 ml. solution containing 6 moles $CuCl_2$ per litre. pH was =2.6.

The results are given in the table below:

| Time interval, min. | Formed product, g. | Reaction products in percent ||||| Mole percent $Cu^{2+}$ ||
|---|---|---|---|---|---|---|---|---|
| | | tri- | tetra- | 1,1- | cis- | Trans-+rem. | Ent. sol. | Outg. sol. |
| 0-30 | 9.19 | 50.3 | 35.0 | | 0.1 | 14.6 | 97 | 88 |
| 30-60 | 10.58 | 62.3 | 26.1 | | 0.1 | 11.5 | 97 | 85 |
| 60-90 | 12.69 | 70.6 | 12.8 | | 0.1 | 16.5 | 97 | 84 |
| 90-120 | 13.39 | 72.1 | 7.2 | | 0.1 | 20.6 | 97 | 83 |

The conversion of acetylene during the test was 40% and the yield of trichloroethylene 65% and of tetrachloroethylene 19%. In the formed retaction product tri- and tetrachloroethylene are easily separated by distillation.

Example 7

In this test the volume of the reactor vessel was about 8 litres, the apparatus for the rest being principally the same as in Examples 4–6. The water solution continuously supplied contained 6 moles/litre copper chloride, 8 mole percent of the total copper amount being present as Cu (I). The pH of the solution was 1.8 and its temperature 100° C. Acetylene was supplied at a rate of 20 normal litres per hour and was converted to a product consisting of 81% (by weight) of trichloroethylene, 12% tetrachloroethylene and 7% trans-dichloroethylene. The conversion of acetylene was 97%.

Example 8

The test was carried out continuously as in Example 7 but the solution contained 4.5 moles of copper chloride and 3 moles of lithium chloride per litre. The amount of Cu (I) was 15 mole percent of the total copper amount, the pH of the solution was 1.8 and its temperature 100° C. 20 normal litres per hour of acetylene was practically completely converted to a product consisting of 76% (by weight) of trichloroethylene, 12% tetrachloroethylene and 12% trans-dichloroethylene, in all 114 g. per hour. The catalyzing solution was then pumped to an oxidation column, where it was oxidized with a mixture of about 60 normal litres of HCl-gas and 30 normal litres of oxygen per hour.

The process may be carried out on a larger scale in an apparatus schematically illustrated in the accompanying drawing.

Principally, the apparatus consists of a reactor 1 having an inlet at the bottom for the chloride solution supplied from a container 3a, an inlet for acetylene and an over-flow for the solution. The reaction product is discharged at the top of the reactor together with the unreacted gas and collected in a condenser 5. The used solution is passed to a container 6b from which it is pumped by a pump 4b to another container 3b. The copper (I) ions in the used solution are oxidized with HCl and $O_2$ in an oxidation column 2 having an inlet at the bottom for the solution supplied from the container 3b and an over-flow from which the solution flows to a container 6a, the solution being pumped therefrom by a pump 4a to the container 3a. The oxidizing gases (HCl and $O_2$) are supplied into the column at the bottom and released at the top.

Instead of using a separate oxidation column the reoxidation may be carried out in a reactor provided with separate inlets for acetylene and the mixture of oxygen and hydrogen chloride.

We claim:

1. Method for the production of trichloroethylene and tetrachloroethylene by a reaction between acetylene and copper chloride in a water solution, which comprises passing acetylene through a reaction solution containing cupric and cuprous ions, in which the cupric ions constitute 50–100 mole percent of the total copper amount, maintaining the pH-value of the reaction solution at 1 to 3 and a reaction temperature of at least 60° C.

2. Method according to claim 1, in which the total chloride ion content in the solution is from 4 g.-atoms per litre up to a solution, which is saturated at the reaction temperature.

3. Method according to claim 1 in which the amount of cupric ions is kept at 70–100 mole percent of the total copper amount.

4. Method according to claim 1 in which the solution besides copper chloride also contains a water soluble chloride of a metal selected from the group consisting of potassium, lithium, calcium, magnesium, aluminum and zinc.

5. Method according to claim 1 in which the solution also contains ammonium chloride.

6. Method according to claim 1 in which the acetylene is supplied at such a rate as to produce in the reaction chamber a pressure which is higher than the pressure of saturated steam at the reaction temperature.

(References on following page)

References Cited by the Examiner

UNITED STATES PATENTS

| | | | |
|---|---|---|---|
| 2,779,805 | 1/1957 | Millard | 260—654 X |
| 2,809,221 | 10/1957 | Thomas et al. | 260—654 |
| 2,915,565 | 12/1959 | Jacobowski et al. | 260—654 |
| 3,079,444 | 3/1963 | Jacobowski et al. | 260—654 |
| 3,184,514 | 5/1965 | Sennewald et al. | 260—654 |
| 3,197,515 | 7/1965 | Chassaing et al. | 260—654 |

LEON ZITVER, *Primary Examiner.*

K. V. ROCKEY, *Assistant Examiner.*